UNITED STATES PATENT OFFICE.

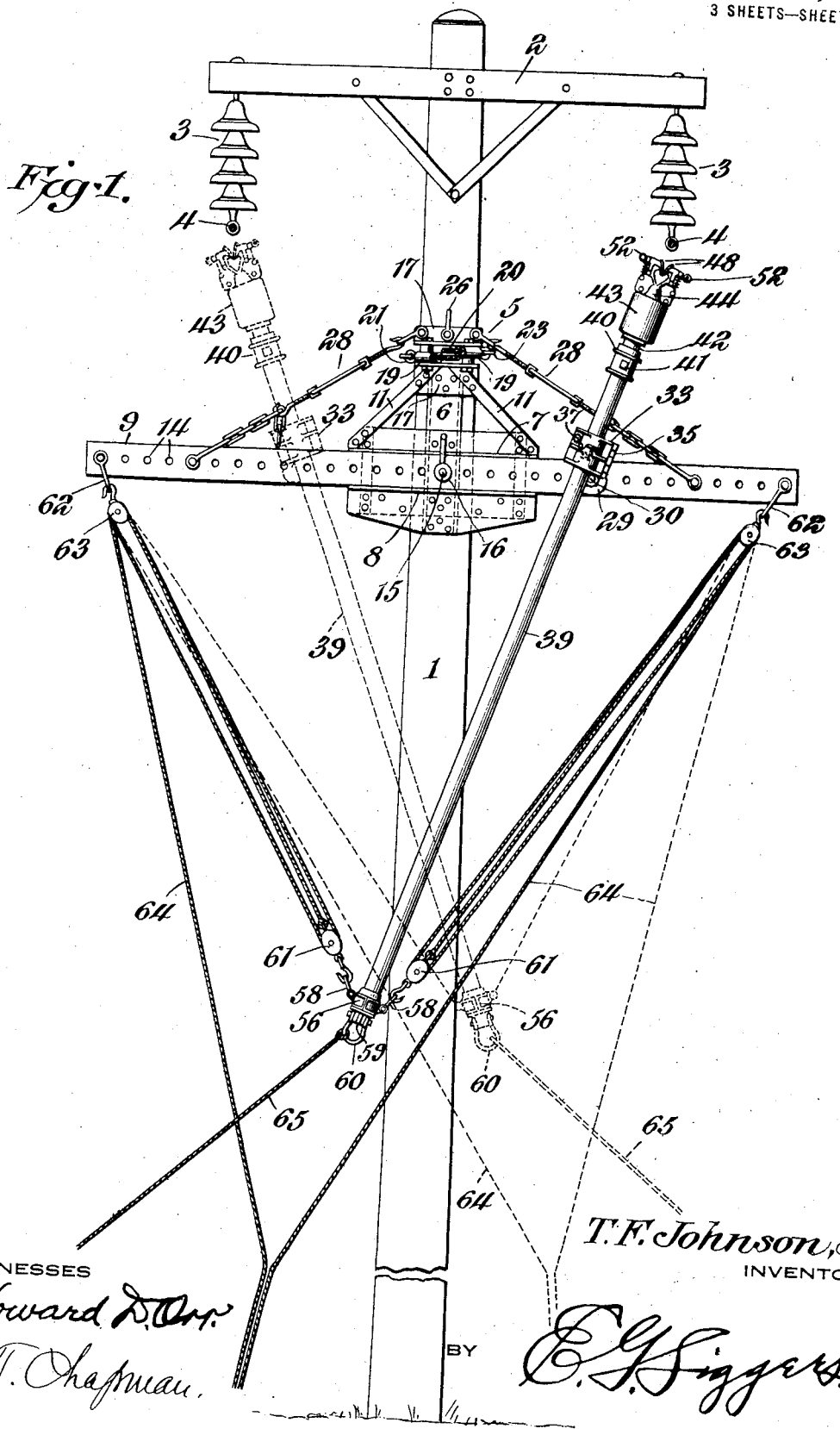

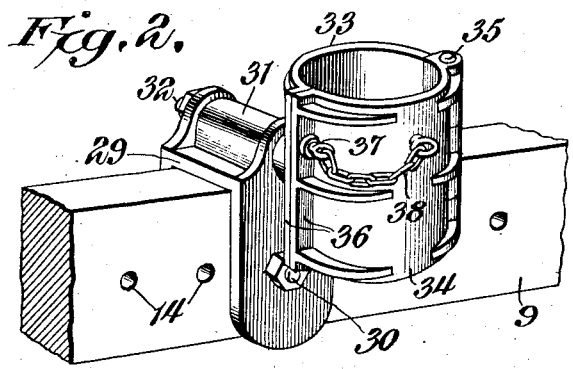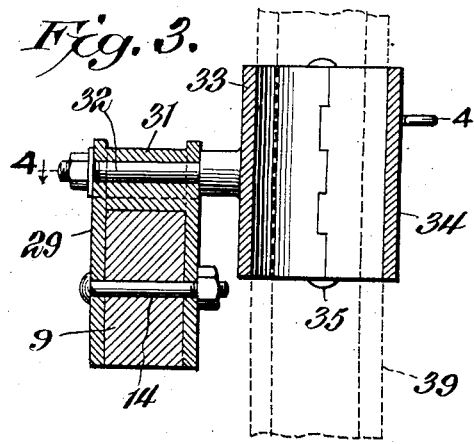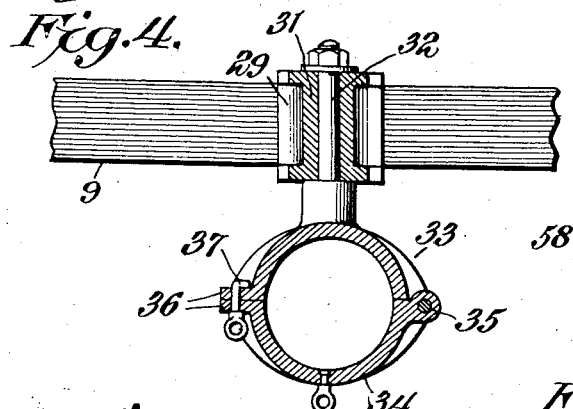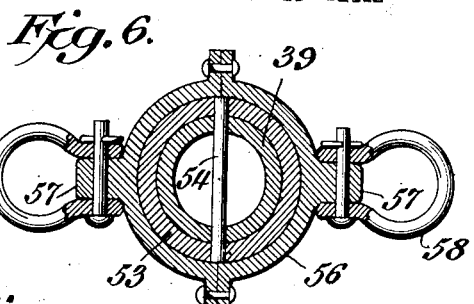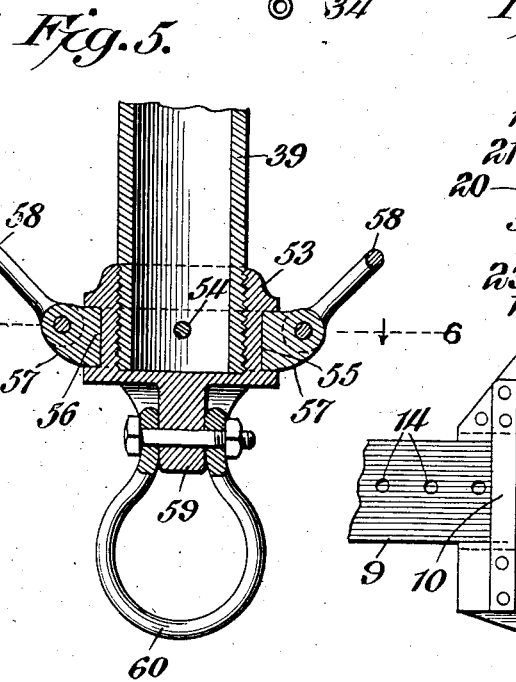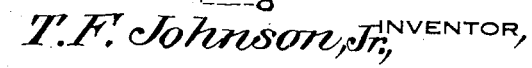

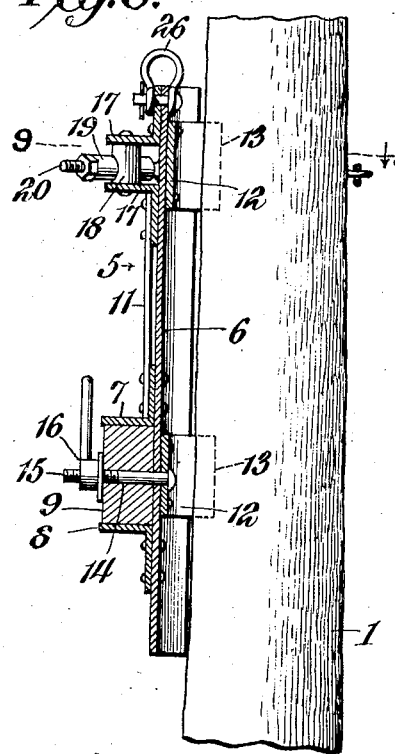
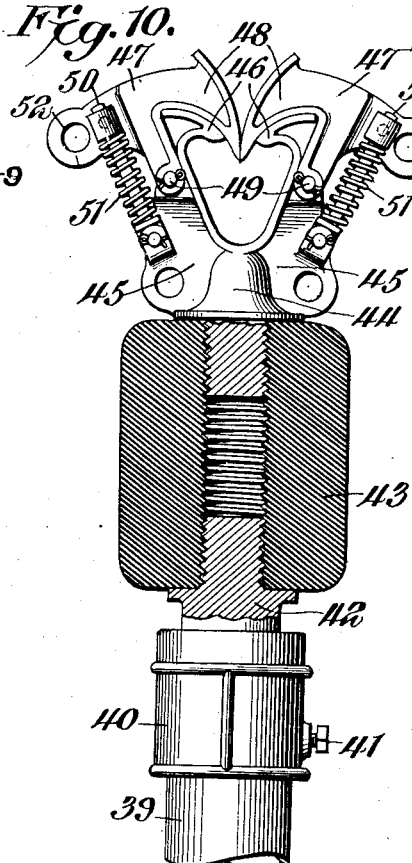
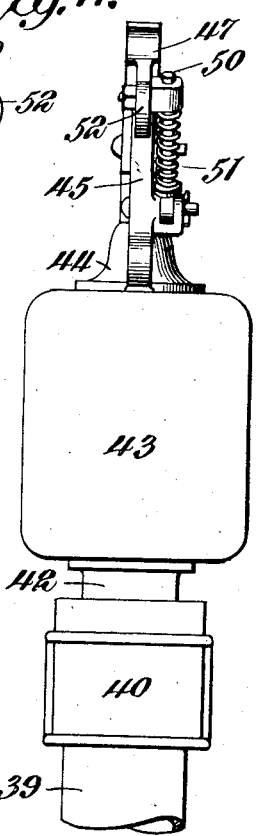
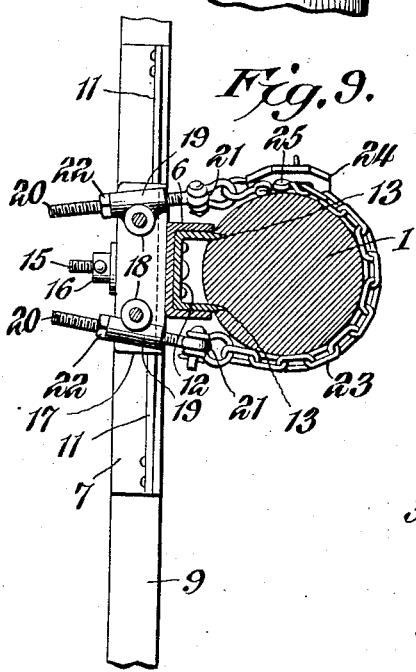
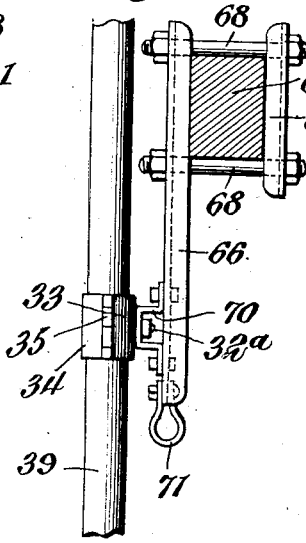
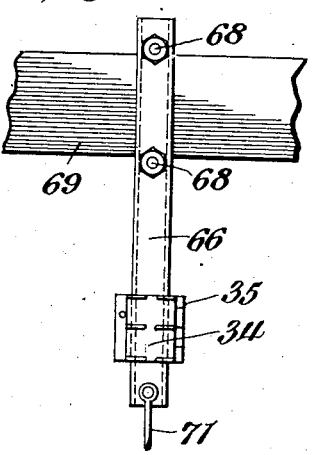

TOMLINSON FORT JOHNSON, JR., OF ATLANTA, GEORGIA.

INSULATOR-CHANGER.

1,394,020.

Specification of Letters Patent.   Patented Oct. 18, 1921.

Application filed March 16, 1918.   Serial No. 222,948.

*To all whom it may concern:*

Be it known that I, TOMLINSON F. JOHNSON, Jr., a citizen of the United States, residing at Atlanta, in the county of Fulton and State of Georgia, have invented a new and useful Insulator-Changer, of which the following is a specification.

This invention has reference to insulator hangers, and its object is to provide means for taking out and replacing defective insulators in high tension transmission lines while the latter are alive, thus avoiding the necessity of cutting off the current from the line and thereby killing the line with consequent loss of service.

In accordance with the invention there is provided a device for temporarily supporting the live transmission line after disconnecting it from a defective insulator and while the insulator, after being so disconnected and therefore safe to handle, is repaired or wholly replaced, after which the live line wire is again connected to the insulator without at any time endangering the operator or operators. The invention further comprises supporting means for the device carrying the line-wire, which supporting means may be attached to a pole and in turn support a temporary cross arm for carrying the line wire supporting means and serving as a standing place for workmen.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is an elevation of a transmission line pole with the invention attached and in position to engage a transmission line wire to support it after being disconnected from a suspension insulator.

Fig. 2 is a perspective view of a portion of a temporary cross arm and a lifting pole pivot carried thereby.

Fig. 3 is a vertical section through substantially the axial line of the lifting pole pivot of Fig. 2.

Fig. 4 is a section on the line 4—4 of Fig. 3.

Fig. 5 is a longitudinal diametric section of the butt end of the lifting pole.

Fig. 6 is a section on the line 6—6 of Fig. 5.

Fig. 7 is a face view of a grab for attachment to a line pole.

Fig. 8 is a section on the line 8—8 of Fig. 7 and showing the grab applied to a line pole.

Fig. 9 is a section on the line 9—9 of Fig. 8.

Fig. 10 is an elevation, with some parts in section, of the line wire engaging end of the lifting pole.

Fig. 11 is an elevation of the structure shown in Fig. 10 but viewed at right angles thereto.

Fig. 12 is a side elevation of an attachment for adapting the insulator changer to an ordinary cross-arm already installed on a pole.

Fig. 13 is a view taken at right angles to the showing of Fig. 12, but omitting the lifting pole.

Referring to the drawings, there is shown in Figs. 1, 8 and 9, a pole 1 such as is used on certain high tension transmission lines but which may be taken as indicative of any suitable support for transmission lines whether of the wooden pole type or of the steel tower type.

The pole 1 is shown as provided with a cross arm 2 such as is frequently used in connection with wooden poles but which may be taken as indicative of any type of cross arm or supporting member for insulators 3 indicated as of the suspension type although not necessarily confined to such particular type. The insulators 3, which in high tension lines comprise two or more insulators in a series, support a line wire 4, the number of insulators in a string depending upon the voltage of the transmission line.

In the case of a wooden or other similar pole there is provided a grab 5 shown separately in Fig. 7 and applied to the pole 1 in Figs. 1, 8 and 9. The grab comprises a channel bar 6 which, when applied to the pole 1, extends lengthwise thereof and fast to the channel bar are cross bars 7 and 8 respectively, spaced apart lengthwise of the channel bar sufficiently to receive a cross arm 9 between them. The cross bars 7 and 8 are angle bars with outstanding webs facing each other to embrace the top and bottom parts of the cross arm 9. The cross bars 7 and 8 are connected near their ends by strips 10 and the top cross bar 7 is further connected to the channel bar 6, which projects considerably above it by stays 11 so that the body of the grab is in the form of a frame constructed largely of structural steel. The mouth of the channel 6 is open toward the pole 1 and fast in the channel near opposite ends thereof are U-shaped anchor pieces 12 projecting beyond the mouth of the channel and there having sharpened edges 13 designed to bite into the pole 1 if the latter be of wood or to engage the pole if of other material, such for instance, of concrete, although, of course, these anchor members 12 may be otherwise formed for engaging other materials than wood.

The cross arm 9, which because of its use may be termed a temporary cross arm, is provided with a longitudinal series of holes or passages 14 for bolts serving a purpose to be described. The grab shown in Figs. 7, 8 and 9 has the cross bars 7 and 8 elongated on opposite sides of the channel bar 6 and a single bolt 15 extending through the cross bar 6 and through the cross arm 9 serves to hold the cross arm firmly to the grab by the use of a single handle nut 16. Under some circumstances more than one bolt 15 may be employed.

At what constitutes the upper end of the grab in use are other cross bars 17 spaced apart one above the other and made fast to the channel bar 6. These cross bars 17 are of angle material and carry between them swivels 18, each of which is pivotally mounted between the cross bars and has a sleeve portion 19 at an angle to the main part of the swivel. Each sleeve 19 is traversed by a screw rod 20 terminating at one end in an eye 21 and also carrying a lock nut 22 whereby the screw rod is securely lodged in the sleeve 19.

One rod 20, there being two such rods at respective opposite ends of the cross bars 17, carries a chain 23 of sufficient length to embrace, in greater part, the pole 1. The other screw rod 20 has flexibly connected thereto a plate 24 which has a keyhole slot 25 shaped to receive the chain 23 and lock a link thereof in the narrow part of the slot 25, whereby the plate 24 serves as a chain lock holding the chain about the pole and the chain may be tightened by means of the nuts 22. At the upper end of the pole grab there are swivel links or clevises 26 and 27, the clevis 26 providing means whereby lifting tackle may be attached to the grab to elevate it to the desired height and the links or clevises 27 serving for the attachment of adjustable braces 28 extending to the cross arm 9 near the outer ends thereof to aid in supporting the cross arm.

Attached to the cross arm 9 is a saddle 29 embracing the cross arm and held thereto by a bolt 30 extending through one of the holes 14 in the cross arm. The saddle is provided with an enlargement 31 traversed by a pivot pin 32 projected from one side of a sleeve 33 having one portion 34, constituting about half the sleeve, connected to the sleeve by a hinged joint 35. On the opposite side of the sleeve the two parts thereof have outstanding meeting flanges 36 traversed by a lock pin 37 carried by the hinge member 34 of the sleeve through the intermediary of a chain 38 so that there is no danger of the pin becoming lost when not in locking position.

The sleeve 33 is of a size to snugly receive a pole 39 which for lightness and strength may be a tubular pole. At one end the pole has a cap 40 applied thereto and this cap may be held to the pole by a set screw 41 or in any other appropriate manner. The cap 40 is provided with a central stem 42 carrying an insulating connection 43 in turn carrying a head 44 in the form of a casting with opposite wings 45 each terminating in a hook 46, the hooks 46 being directed one toward the other but spaced apart at their points sufficiently to admit the line wire 4 between them. Each wing 45 has pivoted thereto a latch 47 having hook ends 48 directed one toward the other and toward the space between said hooks and these latches are each carried by a pivot pin 49 at the center of curvature of the outer faces of the hooks 46 and the inner faces of the hooks 48. Each latch 47 is under the control of a guiding pin 50 surrounded by a spring 51 so that the hooks 48 have a normal tendency to approach and in such position their points are in substantial engagement and close the space between said hooks 46 but diverge in a direction away from the head 44, permitting the head to be readily located with respect to the line wire since the divergence of the outer faces of the hooks 48 serves to guide the head onto the wire. The latches 47 are each formed with an eye 52 whereby, by suitable means, the two latches may be pulled apart when it is desired to remove the head from the line wire.

The other end of the pole 39 has a cap 53 applied thereto, such cap being screwed onto the pole and made fast against accidental displacement by a transverse pin 54. The cap 53 is formed with a circumferential channel 55 in which there is lodged a swivel ring 56 having opposite ears 57 each carrying a pivoted link 58. The end of the cap or socket 53 remote from the pole 39 is formed with a lug 59 to which there is pivoted a link or clevis 60.

The links 58 each receive a sheave block 61 and other links 62 made fast to the ends of the cross arm 9 receive other sheave blocks 63. A rope or strand 64 connects the blocks 61 and 63 into a tackle from each side of the pole 39 at its butt end and the ropes are conveniently brought together at a low point to be there grasped by the hand of the operator for manipulation.

Another rope 65, which may be termed a tail line, is made fast to the clevis 60 for directing the pole 39 when being lifted or lowered by the ropes 64.

The invention in whole or in part is especially adapted for changing insulators of high tension transmission lines without interrupting the service over the lines. Such insulators frequently fail or become faulty and may be tested out and the faulty ones detected by the method described and claimed in my Patent Number 1,366,078, dated Jan. 18, 1921. Whether the faulty insulators be detected by the said method or whether they be of types for which the method is not adapted, the insulator changer of this invention may be used.

In order to better understand the manner of operating the insulator changer it may be assumed that the transmission line is a high voltage line and that the insulators are of the suspension type and arranged in the form of a string for each transmission line if there be more than one transmission line.

It is first necessary to disconnect the transmission line from the insulator and to support it in such manner that there is no liability of harm occurring to the operator or operators. The first thing to be done is to locate the grab on the pole at an appropriate height. This is accomplished by attaching a tackle to the ring 26 and lifting the grab as high as needed, whereupon, the chain 23 is made to encircle the pole 1 and is secured in the lock 24, after which the nuts 22 are tightened so that the grab is firmly anchored in place. Before the grab is elevated the cross arm 9 may be made fast thereto and the various parts carried by the cross arm may also be properly installed or these parts may be later secured in place. The lifting pole 39 is lodged in the sleeve 33 which latter may be secured to the cross arm 9 either before or after the grab is placed in its elevated position.

Now by a suitable manipulation of the tackle carrying the lifting pole and by guiding the latter by the tail line 65 the line engaging head of the pole is caused to engage about the transmission line, after which the transmission line may be disconnected from the string of insulators and moved to one side out of the way, thus leaving room for workmen to remove and replace the insulators without any danger of contact with the transmission line and consequent shock for the operation does not in any manner interrupt the service on the transmission line.

When the insulators are restored to their original condition the pole 29 is manipulated by means of the tackle and tail line 65 to bring the transmission line again into position with relation to the string of insulators to permit refastening it into place. Both the unfastening of the transmission line and the refastening thereof may be performed by tools which need not be herein referred to.

If two or more strings of insulators upon one pole require repairs to cure defects, this is easily accomplished by shifting the lifting pole pivot or guide to another appropriate part of the cross arm, whereupon the lifting pole may be manipulated to remove and hold another line wire out of position to do any harm to the workmen.

Under some conditions the cross arm 9 need not extend beyond both sides of the grab to equal extents but may be extended to one side only of the grab so far as its function of supporting the lifting pole and constituting a stand for the workmen is concerned.

The pivot or swivel support of the lifting pole formed by the sleeve 33 and its mounting permits the guiding of the lifting pole into engaging relation to the line wire and the carrying and supporting of the line wire to one side of and usually higher than its position when carried by the insulators.

For some purposes the pole grab may be omitted and the lifting pole be carried by one of the installed cross-arms of the pole line. This is shown in Figs. 12 and 13. For this purpose there is provided a bar 66, which may be of channel construction, and associated with one end of the bar 66 is a clamp strip 67 which may also be of channel construction. Bolts 68 traverse the two channel members, together constituting a clamp, and secure them to a cross-arm 69, which latter may be considered as fixedly secured to a pole like the pole 1 of the transmission line. The bar 66 is so arranged as to depend from the cross-arm 69 when clamped thereto and at the lower end portion of the bar, there is secured a strap bracket 70 to which there is pivoted a sleeve 33 by a pivot bolt 32ª. At the bottom end of the bar 66 is a link or clevis 71 to which tackle for lifting the pole 39 may be secured. The tackle may be in part like that shown in Fig. 1.

The insulator changer is useful in changing cross arms and even replacing poles without interrupting the service on the line.

The modification shown in Figs. 12 and 13 is more fully shown, described and claimed in an application filed August 26, 1920, Serial No. 406,209.

The construction of the pole grab shown in detail in Figs. 7, 8 and 9, is disclosed and claimed in application Serial No. 406,208, filed August 26, 1920.

What is claimed is:—

1. An insulator changer for high tension circuits, comprising a cross-arm for temporary use, a support for the cross-arm having means for securing it to a line pole, a lifting pole with a retaining head at one end for a line wire and having means at the other end for attaching tackle to the lifting pole, and a pole guide attachable to the cross-arm.

2. An insulater changer for high tension circuits, comprising a lifting pole with means at one end for engaging and holding a live line wire, hoisting tackle connected to the other end of the lifting pole and leading to fixed points at opposite sides of the line pole, a tail line also connected to the same end of the lifting pole, guiding means for the lifting pole, permitting the latter to be shifted from one side to the other of the line pole, and means for securing the guiding means to supporting means for the line wire in the neighborhood of the latter, whereby the lifting pole may be made to engage a live transmisison line wire and carry the latter while the insulators are being disconnected, changed and reconnected to the line wire.

3. An insulator changer for high tension circuits, comprising a lifting pole with means at one end for engaging and holding a live line wire, hoisting tackle connected to the other end of the lifting pole, and leading to fixed points at opposite sides of the line pole, guiding means for the lifting pole, permitting the latter to be shifted from one side to the other of the line pole, and means for securing the guiding means to supporting means for the line wire in the neighborhood of the latter, whereby the lifting pole may be made to engage a live transmission line wire and carry the latter while the insulators are being disconnected, changed and reconnected to the line wire.

4. A lifting pole provided with a head, having opposite wings, each terminating in a rigid hook, said hooks being directed one toward the other but spaced apart sufficiently to admit a line wire, and spring-actuated latch mechanism for closing the space between said hooks, said latch mechanism being yieldable to forces tending to release the line wire.

5. In combination with a line pole, and a permanent cross arm thereon, a cross arm for temporary use arranged below the permanent cross arm, a pole grab movable up and down the line pole and having means for securely holding the grab at any point thereon, means for fastening the temporary cross arm to the pole grab so that said temporary cross arm may serve as a support for a lineman, said means providing for the adjustment of the temporary cross arm in a direction lateral to the height of the line pole, and adjustable brace means between the pole grab and the temporary cross arm.

6. An insulator changer for high tension charged line wires, comprising a lifting pole with a head at one end provided with engaging and holding means for the line wire, means at the other end of the pole for manipulating the pole from a distance, guiding means for the pole, and supporting means for the guiding means attachable to parts of the line installation, the guiding means for the pole comprising a pivotally mounted sleeve having one part separable from the other to permit access to the interior of the sleeve for placing the pole in and removing it from the sleeve.

7. In an insulator changer for high tension charged transmission lines, a lifting pole for the line wire having means for engaging and holding the wire, a grab for attachment to a line pole, a cross-arm for installation on the grab, tackle for connection to the end of the lifting pole remote from the head and for connection to the cross-arm and capable of manipulation from a distance, and a pivotal guide for the lifting pole having a saddle adaptable to the cross-arm and the latter having a series of perforations for the reception of fastening means traversing the saddle, whereby the lifting pole may be located at different points along the cross-arm.

8. In an insulator changer for high tension charged transmission lines, a lifting pole having means at one end for engaging and sustaining a transmission line, a grab structure having means for attaching it to a line pole and provided with a support, a cross-arm adapted to the support and adjustable in a direction lateral to the height of the line pole, adjustable brace means from the grab structure to the cross-arm, and tackle for carrying the lifting pole and having connection with the cross-arm for manipulating the lifting pole.

9. In an insulator changer for high tension charged transmission lines, a lifting pole having at one end a head with a seat for the transmission line and provided with hook shaped latches in normal engagement for retaining the transmission line and movable apart to release the transmission line, and a butt structure for the pole having means for the attachment thereto of tackle including a tail line, whereby the lifting pole may be manipulated from a distance by the tackle.

10. An insulator changer for high tension circuits, comprising a cross-arm for temporary use, a support for the cross-arm having means for securing it to a line pole, a lifting pole with means at one end for engaging and retaining a line wire, means on the cross-arm for guiding the lifting pole, and tackle attached at one end to the lifting pole and at the other end to opposite ends of the cross-arm.

11. An insulator changer for high tension circuits, comprising a cross-arm for temporary use, a support for the cross-arm having means for securing it to a line pole, a lifting pole with means at one end for engaging and retaining a line wire, means on the cross-arm for guiding the lifting pole, and tackle attached at one end to the lifting pole and at the other end to opposite ends of the cross-arm, the guiding means for the lifting pole being adjustable lengthwise of the cross-arm for locating the lifting pole with respect to different line wires carried by the line pole.

12. An insulator changer for high tension circuits comprising a cross arm for temporary use, means for detachably securing it to a line pole, a lifting pole, means on the cross arm for guiding the lifting pole, and means attached to the lifting pole and to the cross arm for manipulating said pole from a distance, said guiding means being adjustable on the cross arm.

13. An insulator changer for high tension charged line wires, comprising a lifting pole with means at one end for engaging and holding a line wire, means at the other end of the pole for manipulating said pole from a distance, and a swiveled guide for the lifting pole.

14. An insulator changer for high tension charged line wires, comprising a lifting pole with a head at one end provided with engaging and holding means for the line wire, means attached to the lifting pole for manipulating the pole from a distance, a swiveled guiding sleeve through which the pole extends, a cross-arm with a series of holes therethrough extending lengthwise of the cross-arm for attachment of the tackle to spaced points on the cross-arm and also for attachment of the swiveled sleeve to different points on the cross arm, and a pole grab having means for attaching it to a line pole and means for securing the cross-arm to said grab.

15. In an insulator changer for high tension charged line wires, a lifting pole having means at one end for engaging and sustaining a line wire, comprising a head having a receptacle for the line wire, and opposed latches with a normal tendency to lock the line wire in the receiving portion of the head, and said pole having rings at the other end on opposite sides for the attachment of tackle and a ring in line with the pole for the attachment of a tail line.

16. In an insulator changer for high tension charged transmission lines, a lifting pole for a charged line wire having means at one end for engaging and holding the line wire and comprising a socket for receiving the line wire with opposed latches at the mouth of the socket yieldable to the entrance of the line wire therein and having a normal tendency to approach and engage to prevent accidental escape of the line wire from the receptacle and said pole having a cap at the other end with a link in line with the pole and other links on opposite sides of the pole.

17. An insulator changer for high tension charged transmission lines, comprising a pole grab movable up and down a line pole and having means for grasping the pole to hold the pole grab thereto, a temporary cross-arm on the pole grab adjustable therein lengthwise of the cross-arm and provided with a longitudinal series of holes or passages, a lifting pole with means at one end for receiving and sustaining a line wire, tackle connected to the other end of the lifting pole and diverging therefrom and attached to opposite end portions of the cross-arm, and a guiding means traversed by and guiding the lifting pole and attached to the cross-arm at any chosen one of the holes therethrough.

18. In an insulator changer for high tension charged transmission lines, a line engaging and supporting pole, a swivel guide for said pole comprising a sleeve formed of sections hinged together with one section having a swivel pin, and a saddle in which the swivel pin is mounted, said saddle being constructed to be secured to a cross-arm.

19. In an insulator changer for high tension charged transmission lines, a line engaging and supporting pole, a swivel guide through which the pole extends and is movable, a support for the swivel guide, and clamping means on the support for securing it to a fixed part of a transmission line pole.

20. An insulator changer for high tension circuits, comprising a lifting pole having means for engaging and holding a line wire, a cross-arm for temporary use, means for securing the cross-arm to a line pole, said cross-arm having a series of perforations therein, a pivotal guide for the lifting pole mounted in any one of the perforations, and means connected to the lifting pole for raising and lowering the same.

21. An insulator changer for high tension charged line wires, comprising a lifting pole with a head at one end provided with engaging and holding means for the line wire, tackle attached to the other end of the lifting pole for manipulating the pole from a distance, a swiveled guiding sleeve through which the pole extends, and a cross-arm with a series of holes therethrough extending lengthwise of the cross-arm for attachment of the tackle to spaced points on the cross-arm and also for attachment of the swiveled sleeve to different points on the cross arm.

22. An insulator changer for high tension circuits, comprising a lifting pole having means at one end for engaging and holding a line wire, and means at the other end for the attachment of tackle including a tail line, whereby the lifting pole may be manipulated from a distance by the tackle, guiding means for the pole, and means for adjusting the guiding means for locating the lifting pole with respect to different line wires.

23. An insulator changer for high tension circuits, comprising a cross-arm for temporary use, means for securing it to a line pole below the usual cross arm of said pole, a lifting pole provided with means at one end for engaging and holding a line wire, and lifting tackle connected to opposite ends of the cross-arm and to the lower end of the lifting pole for raising and lowering said lifting pole.

24. In combination with a line pole, and a permanent cross arm thereon, a cross arm for temporary use arranged below the permanent cross arm, means for detachably securing the temporary cross arm to the line pole, said temporary cross arm serving as a support for a lineman, a lifting pole, and means connected to the lifting pole and to the temporary cross arm for raising and lowering the former.

25. In combination with a line pole, and a permanent cross arm thereon, a cross arm for temporary use arranged below the permanent cross arm, means for detachably securing the temporary cross arm to the line pole, said temporary cross arm serving as a support for a lineman, a lifting pole, means connected to the lifting pole and to the temporary cross arm for raising and lowering the former, and means provided on the temporary cross arm for guiding the movement of said pole.

26. An insulator changer for high tension circuits, comprising a freely movable lifting pole having means at one end for engaging and holding a live line wire, guiding means for said pole, means for mounting said guiding means in connection with a line pole, and means for raising and lowering said lifting pole and for shifting the latter from one side to the other, said means being operable from the ground.

27. An insulator changer for high tension charged line wires, comprising a lifting pole with a head at one end provided with engaging and holding means for the line wire, means at the other end of the pole for manipulating the pole from a distance, guiding means for the pole, and supporting means for the guiding means attachable to parts of the line installation, said guiding means comprising a pivotally mounted sleeve.

28. An insulator changer for high tension charged line wires, comprising a lifting pole, provided with engaging and holding means for the line wire, means for manipulating the pole from a distance, guiding means for the pole, and supporting means attachable to parts of the line installation, said guiding means being pivotally mounted.

29. A pole having a head with opposite wings each of which terminates in a rigid hook, said hooks being directed toward each other but spaced apart sufficiently to admit a line wire, and a spring actuated latch for each hook, said latches being located outside the hooks and normally closing the opening to said hooks, and contacting with each other and diverging away from their point of contact.

30. A pole provided at one end with a head having opposite wings, each terminating in a hook, said hooks being directed toward each other but spaced apart at their points, a latch pivoted to each wing, said latches having hook ends directed one toward the other and toward the space between the said hooks, said hook ends meeting at a point and closing the space between said hooks, and diverging in a direction away from said head, and means for imparting spring tension to said latches.

31. In combination with a line pole, and a permanent cross arm thereon, a cross arm for temporary use arranged below the permanent cross arm, a pole grab movable up and down the line pole and having means for securely holding the grab at any point thereon, means for fastening the temporary cross arm to the pole grab so that said temporary cross arm may serve as a support for a lineman, said means providing for the adjustment of the temporary cross arm in a direction lateral to the height of the line pole.

32. An insulator changer for high tension charged line wires, comprising a lifting pole provided with means for engaging and holding the line wire, means for manipulating said pole from a distance, said means being connected to the lifting pole and mounted on the line pole, and guiding means for the lifting pole and having means for attaching the same to parts of the line installation at one side or the other of the line pole.

In testimony that I claim the foregoing as my own, I have hereto affixed my signature in the presence of two witnesses.

TOMLINSON FORT JOHNSON, Jr.

Witnesses:
  E. H. WILDBERGER,
  I. W. GREENE.